(12) United States Patent
Sun et al.

(10) Patent No.: US 8,030,250 B2
(45) Date of Patent: Oct. 4, 2011

(54) METHOD OF TREATING SUBTERRANEAN FORMATIONS WITH CARBOXYLATED GUAR DERIVATIVES

(75) Inventors: Hong Sun, Houston, TX (US); Frances DeBenedictis, Spring, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 70 days.

(21) Appl. No.: 12/505,272

(22) Filed: Jul. 17, 2009

(65) Prior Publication Data

US 2011/0015100 A1    Jan. 20, 2011

(51) Int. Cl.
*C09K 8/68* (2006.01)
*E21B 43/26* (2006.01)

(52) U.S. Cl. ...... 507/211; 507/217; 507/922; 166/305.1; 166/308

(58) Field of Classification Search ............ 507/209, 507/211, 212, 214, 217, 230, 922; 166/305.1, 166/308

See application file for complete search history.

(56) References Cited

U.S. PATENT DOCUMENTS

| | | |
|---|---|---|
| 3,058,909 A | 10/1962 | Kern |
| 3,215,634 A | 11/1965 | Walker |
| 3,743,613 A | 7/1973 | Coulter et al. |
| 3,974,077 A | 8/1976 | Free |
| 4,242,098 A | 12/1980 | Braun et al. |
| 4,579,942 A | 4/1986 | Brode et al. |
| 4,619,779 A | 10/1986 | Mondshine |
| 4,801,389 A | 1/1989 | Brannon et al. |
| 5,067,566 A | 11/1991 | Dawson |
| 5,082,579 A | 1/1992 | Dawson et al. |
| 5,145,590 A | 9/1992 | Dawson |
| 5,160,643 A | 11/1992 | Dawson |
| 5,201,370 A | 4/1993 | Tjon-Joe-Pin |
| 5,224,544 A | 7/1993 | Tjon-Joe-Pin et al. |
| 5,226,479 A | 7/1993 | Gupta et al. |
| 5,226,481 A | 7/1993 | Le et al. |
| 5,253,711 A | 10/1993 | Mondshine |
| 5,259,455 A | 11/1993 | Nimerick et al. |
| 5,445,223 A | 8/1995 | Nelson et al. |
| 5,447,199 A | 9/1995 | Dawson et al. |
| 5,566,759 A | 10/1996 | Tjon-Joe-Pin et al. |
| 5,624,886 A | 4/1997 | Dawson et al. |
| 5,681,796 A | 10/1997 | Nimerick |
| 5,806,597 A | 9/1998 | Tjon-Joe-Pin et al. |
| 5,813,466 A | 9/1998 | Harris et al. |
| 5,981,446 A | 11/1999 | Qiu et al. |
| 6,017,855 A | 1/2000 | Le et al. |
| 6,024,170 A | 2/2000 | McCabe et al. |
| 6,035,936 A | 3/2000 | Whalen |
| 6,138,760 A | 10/2000 | Lopez et al. |
| 6,186,235 B1 | 2/2001 | Tjon-Joe-Pin et al. |
| 6,251,838 B1 | 6/2001 | Moorhouse et al. |
| 6,348,590 B1 | 2/2002 | Karstens et al. |
| 6,383,990 B1 | 5/2002 | Le et al. |
| 6,387,853 B1 | 5/2002 | Dawson et al. |
| 6,642,185 B2 | 11/2003 | Crews |
| 6,649,572 B2 | 11/2003 | Dawson et al. |
| 6,767,868 B2 | 7/2004 | Dawson et al. |
| 6,793,018 B2 | 9/2004 | Dawson et al. |
| 6,810,959 B1 | 11/2004 | Qu et al. |
| 6,844,296 B2 | 1/2005 | Dawson et al. |
| 7,007,757 B2 | 3/2006 | Gupta et al. |
| 7,012,044 B2 | 3/2006 | Le et al. |
| 7,049,436 B2 | 5/2006 | Gupta et al. |
| 7,151,076 B2 | 12/2006 | Qu et al. |
| 7,203,744 B1 | 4/2007 | Gupta et al. |
| 7,427,583 B2 | 9/2008 | Couillet et al. |
| 2003/0083403 A1 | 5/2003 | Dawson et al. |
| 2005/0272612 A1 | 12/2005 | Dawson et al. |

*Primary Examiner* — Timothy J. Kugel
*Assistant Examiner* — Aiqun Li
(74) *Attorney, Agent, or Firm* — John Wilson Jones; Jones & Smith, LLP

(57) ABSTRACT

The production of hydrocarbons from a subterranean formation is enhanced by use of a well treatment fluid which contains a carboxylated guar which may be prepared by reacting a guar source and a derivatizing agent of the formula $X(CH_2)_n COOH$ or alkali salts thereof, wherein X is selected from the group consisting of $-OSO_2CH_3$; $-OSO_2C_2H_5$; $-OTs$, $-Br$, and $-I$ and n is between from 1 to 4. The intrinsic viscosity of the carboxylated guar in 2% KCl at 27° C. is at least 750 mL/g and the degree of substitution (DS) of the carboxylated guar is typically between from about 0.02 to about 0.15.

24 Claims, No Drawings

METHOD OF TREATING SUBTERRANEAN FORMATIONS WITH CARBOXYLATED GUAR DERIVATIVES

FIELD OF THE INVENTION

The invention relates to a method of enhancing the productivity of a hydrocarbon-bearing subterranean formation by use of a well treatment fluid containing a carboxylated guar having high intrinsic viscosity.

BACKGROUND OF THE INVENTION

A common method of increasing productivity of a hydrocarbon-bearing formation penetrated by a wellbore is to subject the formation to stimulation techniques, such as hydraulic fracturing. Fracturing of a subterranean formation is accomplished by pumping a fracturing fluid into the wellbore which penetrates the formation at a sufficient pressure and flow rate such that cracks or fissures are opened into the surrounding formation. The fracturing fluid typically contains a proppant which functions to prop open created fractures such that the fracture provides larger flow channels through which an increased quantity of a hydrocarbon may flow. Productive capability of the well is therefore increased.

Fracturing fluids are typically viscous gels in order to provide a medium that will adequately suspend and transport the solid proppant as well as impair the loss of fracture fluid to the formation during the treatment. The fracturing fluid, typically water or oil-based, usually contains a viscosifying polymer which serves to increase the viscosity of the fluid. The fracturing fluid's viscosity is proportionally related to the created fracture geometry and fracture width so that more viscous fluids will produce longer and wider fractures.

Common viscosifying agents for use in fracturing fluids are polysaccharides (galactomannans), such as guar gum and guar gum derivatives. The most commonly used guar gum derivatives are carboxymethyl guar (CMG) and carboxymethyl hydroxypropyl guar (CMHPG). Gelled fracturing fluids containing guar gum derivatives are highly desirable for certain fracturing applications because they exhibit excellent proppant transport properties and high thermal stability. As such, they have particular applicability in high temperature applications.

Further enhancement of the viscosity of the fracturing fluid may be obtained by using a crosslinking agent in conjunction with the viscosifying polymer. Typical crosslinking agents include those which are titanium, aluminum, boron and zirconium based as well as those which are boron based.

Typically, carboxylated guars used in hydraulic fracturing operations are formed by derivatizing the guar seed endosperm, often referred to as a "split", which is generally semi-spherical in shape (about ⅛" long and ¹⁄₁₆" in diameter) and from about 0.5 mm³ to about 1 mm³ in volume. Guar splits are typically treated with aqueous caustic to cause swelling, and then exposed to a derivatizing agent, such as sodium chloroacetate ("SCA") in an amount necessary to provide a desired molar degree of substitution ("DS") value, which is the number of hydroxyl groups on each pyrannoside sugar occupied by the derivative. Typical guar split derivatization yields using SCA are about 60%, with about 40% of the SCA being consumed to form undesirable byproducts such as glycolic acid. Following derivatization, the splits are typically cooled and washed to remove excess caustic and unwanted byproducts before being dried and ground to a powder.

After the fracturing fluid is injected into the formation to produce the fracture, the viscosity of the fluid is reduced as the gel slowly degrades. As the viscosity decreases and pressure is released, the fractures relax and close on the proppant pack. The well is then cleaned up by flowing the fluid of decreased viscosity out of the well. Clean-up may be hindered by formation damage caused by gel residue left in the proppant pack. The effectiveness of well clean-up and the degree of gel residue left in the fracture often determine ultimate hydrocarbon production from the well. It is desirable to reduce loading of the viscosifying polymer in the fracturing fluid as much as possible in order to reduce formation damage. In addition, when equivalent fracturing fluid performance may be obtained with lower loadings of polymer, overall treatment costs are reduced.

A need exists for improved fracturing fluids which exhibit high viscosity at lower polymer loadings. It is desirable that such fluids further cause minimal formation damage such that clean-up may be more efficient, thereby improving production of hydrocarbons from the well.

SUMMARY OF THE INVENTION

The invention relates to a method for enhancing the production of a hydrocarbon bearing formation by introducing into the hydrocarbon-bearing formation a carboxylated guar prepared by reacting a guar source and a derivatizing agent. The derivatizing agent is of the formula $X(CH_2)_n COOH$ or alkali salts thereof, wherein X is selected from the group consisting of —$OSO_2CH_3$; —$OSO_2C_2H_5$; —OTs, —Br, and —I and n is between from 1 to 4. The intrinsic viscosity of the carboxylated guar in 2% KCl at 27° C. is at least 750 mL/g. The degree of substitution (DS) of the carboxylated guar is typically between from about 0.02 to about 0.15. The carboxylated guar has particular applicability when used in a fracturing fluid. The high viscosity of the carboxylated guar enables the polymer to be used at a lower loading than conventional carboxylated guars.

The carboxylated guar described herein is prepared under milder conditions than those used to prepare conventional guar derivatives. In particular, the carboxylated guar described herein is prepared at lower reaction temperatures and at shorter reaction times. Under such conditions, higher molecular weight is preserved. For instance, at least 70% of the initial molecular weight of the guar source is maintained in the carboxylated guar when the reaction conditions described herein are employed. As such, the molecular weight of the carboxylated guar of the invention is much higher than the molecular weight of conventional carboxylated guars.

In another embodiment of the invention, a crosslinked fracturing gel is prepared using the novel carboxylated guar by the addition of a crosslinking agent to the aqueous mixture containing the carboxylated guar.

In still another embodiment of the invention, a method for treating a well is disclosed which includes the steps of forming an aqueous slurry containing carboxylated guar; combining the slurry with a derivatizing agent under conditions such that the carboxylated guar and the derivatizing agent react to form a derivatized polymer which may further be reacted with an alkylene oxide. The carboxylated guar may then be combined with a crosslinking agent. The aqueous fluid containing the carboxylated guar and crosslinking agent may then be introduced into the subterranean formation at a pressure above the fracturing pressure of the subterranean formation.

DETAILED DESCRIPTION OF THE PREFERRED EMBODIMENTS

For purposes herein, the term "carboxylated guar" refers to the carboxyalkyl guar as well as carboxyalkyl hydroxyalkyl guar as well as mixtures of such guars. Preferred carboxylated guars include carboxymethyl guar and preferred carboxyalkyl hydroxyalkyl guars include carboxymethyl hydroxypropyl guar.

The carboxylated guar is typically prepared by combining an aqueous mixture containing a guar source with a derivatizing agent under conditions that the guar source and derivatizing agent react to form a derivatized guar of high intrinsic viscosity and lower degree of substitution than conventional guars.

The guar source may include any grade of guar gum. For instance, the guar source may be guar pod harvested from the endosperm of leguminous seeds. Typically, the guar pod is sun dried and the seeds manually separated prior to use. The diameter of the seed is approximately 4 mm. The guar source may further be relatively large polymer particles, such as seed endosperms, and relatively small polymer particles, such as powders.

Typically, the guar source may be the endosperm, also called the guar split, which constitutes approximately 30-40% of the seed. The guar source may further be derived from the reminder of the seed, referred to as the hull (approximately 15%) and the inner germ (approximately 45%). For instance, the guar source may be the refined guar split which is the polished fibrous layers removed from the husk. The guar source may further be guar gum which is produced from refined guar split by softening, flaking, pulverization and sieving.

The guar source is typically composed of straight-chain mannan units with single-membered galactose branches. The ratio of galactose to mannose in the guar polymer is typically 1:2. In guar, mannose units are typically linked in a 1,4-β-glycositic linkage with galactose units attached by means of a 1,6 linkage on alternate mannose units.

More typically the guar source is a powder since they offer high surface area and thus provide a greater surface area to be exposed for derivatization. As a result, a more uniform and random substitution of the guar source by the derivatizing agent results. Typically, powders having a size of between about 60 mesh and about 400 mesh, more typically between about 100 and about 325 mesh. In a preferred embodiment, guar powder known as "GUAR X0694-17-1" and available from Aqualon (Hercules, Inc.) may be used.

The derivatizing agent is of the formula $X(CH_2)_n COOH$ or alkali salts thereof, wherein X is selected from the group consisting of —$OSO_2CH_3$; —$OSO_2C_2H_5$; —OTs (tosylate), —Br, and —I and n is between from 1 to 4. The derivatizing agent is especially effective in assisting in the reduction of undesirable degradation of the reaction product and facilitates derivatization to proceed at lower temperature (ideally at room temperature). The weight ratio of the guar source to the derivatizing agent is typically between from about 20:1 to about 1:1 and is preferably approximately 5:1.

Typically, the reaction of the guar source and the derivatizing agent proceeds in caustic solution. The caustic solution swells the guar source and further activates the derivatizing sites on the guar source. Typically, the caustic solution contains a stoichiometric excess of basic compound or alkaline agent to the derivatizing agent in order to ensure activation of derivatization sites. In this regard a stoichiometric excess of greater than about 100%, more typically greater than about 125%, and most typically greater than or equal to about 150% based on the weight of derivatizing agent, of basic compound or alkaline agent is required to activate polymer derivatization sites. Typically, the pH of the caustic solution is between from about 11.0 to 14.0 or higher.

Acceptable basic compounds and alkaline agents include, among other things, any agent suitable for swelling the polymer particles, forming alkoxides and which does not react substantially with the derivatizing agent. Examples of suitable basic compounds and alkaline agents include, but are not limited to, inorganic and organic derivatives such as alkali metal and alkaline earth metal hydroxides, quaternary ammonium hydroxides, alkoxides, organic acid salts, and the like. Illustrative of specific basic compounds are sodium hydroxide, potassium hydroxide, calcium hydroxide, barium hydroxide, sodium carbonate, potassium acetate, sodium methoxide, tetramethylammonium hydroxide, and the like, caustic (sodium hydroxide), or mixtures thereof. Typically, caustic (NaOH), a mixture of caustic and potassium hydroxide, or potassium hydroxide is employed. Most typically, caustic is employed. In this regard, the amount of caustic (expressed as 100% active caustic) typically ranges between from about 25% (based on the weight of polymer) of the guar source to about four times the amount of guar source.

The derivatizing reaction may be conducted in an aprotic solvent by, for example, suspending the guar source in the aprotic solvent followed by introducing the caustic solution which swells the guar source. The derivatizing agent may then be added. Suitable aprotic solvents include tetrahydrofuran, 1,4-dioxane and/or hydrocarbon solvent (like diesel, kerosene, refined aliphatic oil, mineral oil or a mixture thereof). In a preferred embodiment, the aprotic solvent is tetrahydrofuran or 1,4-dioxane. Such solvents do not promote solvolysis which typically results in non-oxidative polymer degradation. Carboxylated guars prepared in such solvents therefore often are characterized by exhibit higher molecular weights than carboxylated guars prepared in protic solvents. When used, the volume ratio of the aprotic solvent to the water in the caustic solution is typically greater than 5:1, more typically greater than 10:1.

The reaction of the guar source and the derivatizing agent is typically conducted at a temperature between from about 40° C. to about 90° C. Reaction time is typically for at least one hour in order to ensure the desired degree of substitution. Desired reaction conditions may be attained, for instance, by circulating the slurry containing the guar source through a conventional heater. The derivatization reaction may also be conducted in such conventional vessels as frac tanks, reactor vessels, etc.

The derivatization reaction normally proceeds in a substantially inert or substantially carbon dioxide-free and substantially non-oxidizing (e.g., oxygen free) atmosphere to prevent oxidation and/or degradation of the derivatized guar. The inert atmosphere may be, for instance, provided by degassing with nitrogen, helium, argon, or any other gas that does not substantially inhibit or interfere with the derivatizing reaction. Degassing removes diatomic oxygen molecules from the reaction vessel which, under alkaline conditions, can dramatically degrade the carboxylated guar. Alternatively, derivatization may be carried out in the absence of a gaseous atmosphere.

In order to produce carboxyalkyl hydroxyalkyl guar an alkylene oxide is further introduced to the guar source along with the derivatizing agent. Alternatively, the alkylene oxide may be added to the carboxylated guar which obtained from the reaction of the guar source and derivatizing agent. In a preferred embodiment, the carboxyalkyl hydroxyalkyl guar is carboxymethyl hydroxypropyl guar wherein the alkylene oxide is propylene oxide.

The derivatization reaction is typically accomplished by combining the aqueous slurry containing the guar source and the derivatizing agent under conditions such that the polymer and derivatizing agent react to form the derivatized polymer. As used herein, the term "combining" includes any method suitable for admixing, exposing, contacting, or otherwise causing two or more materials, compounds, or components to come together in a manner sufficient to cause at least partial reaction and/or at least partial mixing to occur between the components. Examples of suitable methods of combining include, but are not limited to, adding one component to another component or vice versa, simultaneously adding together streams or batches of one or more components, and adding components sequentially. The combining methods for the derivatization reaction may include, but are not limited to, adding the derivatizing agent to a slurry containing the guar source, adding the slurry containing the guar source to the derivatizing agent, simultaneously mixing streams of aqueous slurry containing the guar source and derivatizing agent, and any combination thereof. In conjunction with these methods of combining, derivatization is typically accomplished using batch mix processes.

Although not required in the practice of the disclosed method, the slurry containing the carboxylated guar may be treated with a relatively small volume of an acidic agent or compound to consume any excess alkaline material remaining from the derivatization step, for example, to allow or facilitate polymer hydration. When such neutralization is desired, any acidic agent or compound suitable for neutralizing a polymer slurry may be employed. For example, typical neutralizing acids include, but are not limited to, fumaric acid, formic acid, sodium diacetate, sulfamic acid, acetic acid, glacial acetic acid, hydrochloric acid, mixtures thereof, etc.

The degree of substitution (DS) of the carboxylated guar prepared in accordance with the invention is typically between from about 0.02 to about 0.15, more typically between from about 0.04 to about 0.12. Conventional commercial carboxylated guars have a DS of about 0.18.

Further, the carboxylated guar described herein has a higher molecular weight than those carboxylated guars conventionally used in hydraulic fracturing. The molecular weight of the carboxylated guar is typically greater than or equal to 2,500,000.

One method of characterizing higher molecular weight of the carboxylated guar is by measuring the intrinsic viscosity of the polymer. Intrinsic viscosity is related to the molecular weight by Mark-Houwink-Sakurada equation, $[\eta]=K M_v^\alpha$, where, K and $\alpha$ are inherent property of polymer types, i.e., the same type of polymer has very similar K and $\alpha$ values. Thus the intrinsic viscosity has been used to evaluate the relative size and molecular weight of polymers of the same type. All CMGs have similar repeating units, so molecular weight is directly proportional to the length of polysaccharide chains and thus intrinsic viscosity. To obtain the intrinsic viscosity of a polymer, a tube viscometer is typically used and the retention time of the solvent passing through two marks on the tube viscometer is measured and recorded as $t_0$, and retention times, t, of the polymer solutions of different concentrations are also recorded. Specific viscosity $\eta_{sp}$ is defined as $(\eta-\eta_0)/\eta_0$ (wherein $\eta_0$ represents viscosity of the solvent), which equals to $(t-t_0)/t_0$. The $\eta_{sp}/C$ values (defined as reduced viscosity) are plotted against C, wherein C is the concentration of polymer solution, normally in the units of mg/L. A straight line is obtained and the intercept (obtained by extrapolating the straight line to C equals to 0) represents intrinsic viscosity of the polymer, in unit of mL/g.

The carboxylated guar has an intrinsic viscosity, in 2% KCl at 27° C., greater than or equal to 750 mL/g and is preferably greater than or equal to 850 mL/g.

The use of the carboxylated guar, as described herein, is highly desirable in fracturing fluids since a lower polymer loading is necessary when compared to the carboxylated guars used in prior art fracturing fluids. The use of the lower polymer loading herein does not compromise essential fluid properties necessary to perform the fracturing treatment.

Following derivatization and neutralization, the derivatized guar may be stored for later use and then used to form the treatment fluid with any other desired components (such crosslinking agents, proppants, breakers, clay protection agents, etc.) prior to being introduced into the wellbore.

The well fracturing fluid of the invention includes an aqueous base fluid, the carboxylated guar and a suitable crosslinking agent for crosslinking the carboxylated guar to form a polymer gel. The aqueous base fluid may be, for example, water or brine. Any suitable mixing apparatus may be used for the blending step. In the case of batch mixing, the carboxylated guar and aqueous fluid are blended for the requisite time to form the fluid. A crosslinker and a suitable proppant, when desired, may then be added to the fluid.

Preferred crosslinking agents are those which are heat or time activated. Trivalent or higher polyvalent metal ion containing crosslinking agents are preferred. Examples of the trivalent or higher polyvalent metal ions include boron, titanium, zirconium, aluminum, yttrium, cerium, etc. or a mixture thereof. Boron, titanium and zirconium are preferred. Examples of titanium salts include titanium diisopropoxide bisacetyl aminate, titanium tetra(2-ethyl hexoxide), titanium tetraisopropoxide, titanium di(n-butoxy)bistriethanol aminate, titanium isopropoxyoctylene glycolate, titanium diisopropoxy bistriethanol aminate and titanium chloride. Examples of zirconium salts include zirconium ammonium carbonate, zirconium chloride, sodium zirconium lactate, zirconium oxyacetate, zirconium acetate, zirconium oxynitrate, zirconium sulfate, tetrabutoxyzirconium(butyl zirconate), zirconium mono(acetylacetonate), zirconium n-butyrate and zirconium n-propylate. The crosslinking agent may optionally be encapsulated. Examples of typical crosslinking agents include, but are not limited to, those described in U.S. Pat. Nos. 4,514,309 and 5,247,995, which are incorporated herein by reference. Other examples of crosslinking agents include those having a source of comprise a source of borate ions. Such crosslinking agents may be selected from the group consisting of alkali metal borates, alkaline earth metal borates, boric acid, borate ores, borates complexed to organic compounds, and mixtures thereof. Typically, the amount of crosslinking agent used in the fracturing fluid is between from about 0.001% to 1.5%, preferably from about 0.005% to 1.0%, by weight of the aqueous fluid.

The fracturing fluid may also be buffered to a desired alkaline pH range. The pH range can be adjusted with any of a number of available alkaline buffers of the type commonly used in the industry, such as potassium carbonate or mixtures of potassium carbonate and potassium hydroxide. The optimum pH range is from about 8.5 to 11.5, most preferably from about 9.0 to 10.5.

The fracturing fluid may further contain a breaker for the crosslinked gel. The breaker is used to assist in removal or breakdown of the fracturing fluid upon completion of the fracturing operation. Breakers can include any of those commonly employed in the art.

The fracturing fluids of the invention may also have incorporated therein a suitable proppant. Propping agents are typically added to the base fluid prior to the addition of the crosslinking agent. Suitable proppants include those conventionally known in the art including quartz, sand grains, glass beads, aluminum pellets, ceramics, plastic beads and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. Further the proppant may include porous ceramics or organic polymeric particulates. The porous particulate material may be treated with a non-porous penetrating material, coating layer or glazing layer. For instance, the porous particulate material may be a treated particulate material, as defined in U.S. Patent Publication No. 20050028979 wherein (a) the ASG of the treated porous material is less than the ASG of the porous particulate material; (b) the permeability of the treated material is less than the permeability of the porous particulate material; or (c) the porosity of the treated material is less than the porosity of the porous particulate material. When present, the amount of proppant in the well treatment fluid is typically between from about 0.5 to about 12.0, preferably between from about 1 to about 8.0, pounds of proppant per gallon of well treatment fluid.

The base fluid can also contain other conventional additives common to the well service industry such as surfactants, corrosion inhibitors, and the like. For instance, the fluid may contain one or more treatment agents used to control fines or clay swelling or migration such as clay substitutes of the type based on tetramethylammonium chloride, or potassium chloride or polycationic clay control additives such as BJ Services' Claymaster 5C, or mixtures of these clay control additives.

In addition, the aqueous fluid may further contain a crosslinking delaying agent. The amount of crosslinking delaying agent in the aqueous fluid will vary based on design. Suitable crosslinking or viscosification delaying agents may include organic polyols, such as sodium gluconate; sodium glucoheptonate, sorbitol, mannitol, phosphonates, bicarbonate salt, salts, various inorganic and weak organic acids including aminocarboxylic acids and their salts (EDTA, DTPA, etc.) and citric acid and mixtures thereof. Preferred crosslinking delaying agents include various organic or inorganic acids, sorbitol as well as mixtures thereof. Such crosslinking delaying agents, when used, are typically desirous to delay or inhibit the effects of the crosslinking agent and thereby allow for an acceptable pump time of the well treatment composition at lower viscosities. Thus, the crosslinking delaying agent inhibits crosslinking of the polysaccharide until after the well treatment composition is placed at or near desired location in the wellbore. In this capacity, the crosslinking delaying agent may be used in lieu of, or in addition to, the delayed viscosification agents referenced above.

The fracturing fluid is pumped into a subterranean formation, which is penetrated by a wellbore, for a time and at a pressure sufficient to fracture the formation. As used herein, "introduced into a wellbore" includes pumping, injecting, pouring, releasing, displacing, spotting, circulating or otherwise placing a material within a well or wellbore using any suitable method known in the art.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

20 g guar gum (available as GW-3 from BJ Services Company) was suspended in 100 mL isopropyl alcohol (IPA) with magnetic agitation. The mixture was purged with nitrogen for 30 minutes. 1.42 50% NaOH solution was then added drop by drop into the mixture and the temperature was slowly raised to 45° C. 4.6 g saturated sodium chloroacetate (SCA) solution (about 44%) was added drop by drop and the resultant mixture was allowed to react at this temperature for 30 minutes. Heating was then stopped.

The IPA was then filtered off and the filter cake was washed with 80% aqueous methanol six times (total 200 mL) followed by 40 mL methanol. The filter cake was left on the funnel and air-dried overnight and carefully pulverized afterwards.

The novel CMG thus obtained was found to have a DS of 0.08.

Example 2

A fluid with 15 ppt of polymer loading was then prepared by hydrating 1.80 g of the powder of a modified CMG polymer having a DS of 0.08 in 1 L of water. After mixing for about 60 minutes, 1 ml of a 50% aqueous tetramethylammonium chloride solution was added. The pH of the solution was increased by adding 5% aqueous NaOH. Lastly, 0.3 ml of a zirconium lactate crosslinking agent (5.3% $ZrO_2$) was added under conditions of excessive shear (using a Waring Blender) for thirty seconds. The resulting product was a viscous semi-solid gel.

About 48 g of the resulting gel was then placed into a Fann cup (R1B1 cup and bob geometry) and the cup positioned back onto the Fann 50 rheometer. The sample was pressured to about 400 psi with nitrogen and was pre-conditioned by shearing at 105 $sec^{-1}$ for 60 sec. Afterwards, a rate sweep, using 100, 80, 60 and 40 $sec^{-1}$, was made and repeated every 30 minutes. After the initial sweep, the fluid was heated at 150° F. The shear rate and corresponding stresses were used to determine the Power Law indices, n' and K. This procedure is described in American Petroleum Institute publication RP-39.

After the initial rate sweep, the fluid was heated to 150° F. for the duration of the test. The interim rate between sweeps was 105 $sec^{-1}$. The viscosity of the fluid under shearing rate of 40 $sec^{-1}$, 100 $sec^{-1}$ and 170 $sec^{-1}$ was then calculated and compared to fracturing fluid using 16 ppt CMG under the same conditions. The results are reported in the Table I below and demonstrate the rheological performance of the sample as the gelant in a fracturing fluid.

TABLE I

| Time | 16 ppt commercial CMG | | | 15 ppt 0.08 DS CMG | | |
|---|---|---|---|---|---|---|
| Min | 40 S$^{-1}$ | 100 S$^{-1}$ | 170 S$^{-1}$ | 40 S$^{-1}$ | 100 S$^{-1}$ | 170 S$^{-1}$ |
| 2.1 | 493 | 311 | 238 | 1184 | 797 | 633 |
| 32.1 | 381 | 250 | 196 | 738 | 595 | 525 |
| 62.1 | 463 | 312 | 249 | 746 | 588 | 513 |
| 92.1 | 546 | 368 | 292 | 718 | 571 | 500 |
| 122.1 | 572 | 384 | 305 | 694 | 556 | 489 |
| 152.1 | 534 | 384 | 317 | 665 | 536 | 473 |
| 182.1 | 481 | 313 | 244 | 644 | 515 | 452 |

The polymer was then evaluated at 200, 250 and 300° F. with loadings of 16 ppt, 25 ppt and 32 ppt respectively. The data were compared to those of 20 ppt, 30 ppt and 40 ppt commercial CMG at the corresponding temperatures and the results were summarized in Table II (200° F.), Table III (250° F.) and Table IV (300° F.).

TABLE II

| Time | 20 ppt commercial CMG | | | 16 ppt 0.08 DS CMG | | |
|---|---|---|---|---|---|---|
| Min | 40 S$^{-1}$ | 100 S$^{-1}$ | 170 S$^{-1}$ | 40 S$^{-1}$ | 100 S$^{-1}$ | 170 S$^{-1}$ |
| 2.1 | 49 | 34 | 28 | 27 | 22 | 19 |
| 32.1 | 642 | 378 | 278 | 661 | 537 | 477 |
| 62.1 | 768 | 462 | 345 | 746 | 585 | 508 |
| 92.1 | 787 | 472 | 351 | 753 | 591 | 513 |
| 122.1 | 823 | 494 | 368 | 750 | 587 | 509 |

TABLE III

| Time | 30 ppt commercial CMG | | | 25 ppt 0.08 DS CMG | | |
|---|---|---|---|---|---|---|
| Min | 40 S$^{-1}$ | 100 S$^{-1}$ | 170 S$^{-1}$ | 40 S$^{-1}$ | 100 S$^{-1}$ | 170 S$^{-1}$ |
| 2.1 | 104 | 63 | 47 | 84 | 49 | 36 |
| 32.1 | 1844 | 1116 | 835 | 2000 | 1248 | 950 |
| 62.1 | 1716 | 1044 | 782 | 1628 | 1156 | 948 |
| 92.1 | 1588 | 964 | 722 | 1620 | 1006 | 764 |
| 122.1 | 1521 | 924 | 692 | 1633 | 1123 | 904 |
| 152.1 | 1450 | 885 | 665 | 1518 | 1031 | 824 |
| 182.1 | 1385 | 844 | 634 | 1389 | 935 | 743 |

TABLE IV

| Time | 40 ppt commercial CMG | | | 32 ppt 0.08 DS CMG | | |
|---|---|---|---|---|---|---|
| Min | 40 S$^{-1}$ | 100 S$^{-1}$ | 170 S$^{-1}$ | 40 S$^{-1}$ | 100 S$^{-1}$ | 170 S$^{-1}$ |
| 2.1 | 187 | 107 | 78 | 276 | 112 | 66 |
| 32.1 | 1831 | 1066 | 779 | 1470 | 1284 | 1187 |
| 62.1 | 1102 | 656 | 486 | 1214 | 818 | 651 |
| 92.1 | 637 | 391 | 295 | 705 | 474 | 377 |
| 122.1 | 356 | 220 | 167 | 405 | 269 | 213 |

These results clearly show that when used in fracturing fluids, this new CMG can be used at lower loading to achieve viscosity even higher than commercial CMG products at higher loading.

Example 3

This Example contrasts the intrinsic viscosity of the polymers in Example 1. Intrinsic viscosity is related to the molecular weight by Mark-Houwink-Sakurada equation, $[\eta]=K M_\nu^\alpha$, where, K and $\alpha$ are determined by polymer types.

About 2.88 g of the polymer (after consideration of moisture) in 1 L DI water was stirred for at least one hour. About 20 g KCl was then added. The resulting solution was then mixed for 2 more hours and was diluted with 2% KCl solution to form solutions with concentrations (C) of 0.2 mg/mL, 0.16 mg/mL, 0.12 mg/mL, 0.08 mg/mL and 0.04 mg/mL. Solutions with the same concentrations of a commercial CMG sample were prepared the same way. A water bath was used to maintain the temperature at 27° C. throughout the measurement. An ASTM 100 viscometer was used and each solution was allowed to sit in the viscometer for 15 minutes to ensure the consistent temperature. The retention time of 2% KCl solution was measured and recorded as $t_0$, and retention time t (including $t_0$) of each solution was measured 3 times with difference less than 0.3 seconds. The $(t-t_0)/t_0/C$ values were plotted against C. The straight line was extrapolated to C equals 0 and the intercept was the intrinsic viscosity, normally in unit of mL/g. The intrinsic viscosities of this new polymer and commercial CMG are reported in the Table V below:

TABLE V

| Polymer | [η] (mL/g) | R$^2$ |
|---|---|---|
| Commercial CMG | 662.7 | 0.9597 |
| 0.08 DS CMG | 927.2 | 0.9665 |

The intrinsic viscosity can be used to evaluate the relative size of polymers, since all CMGs have similar repeating units and thus molecular weight is directly proportional to the length of polysaccharide chains. Table V shows that this lower DS CMG preserves the high molecular weight better than current commercial CMG products, and its chains are at least 40% longer than those of commercial CMGs. The superior rheological properties and higher yield of the crosslinked gel of the inventive polymer is attributed to its higher molecular weight.

From the foregoing, it will be observed that numerous variations and modifications may be effected without departing from the true spirit and scope of the novel concepts of the invention.

What is claimed is:

1. A method for enhancing the productivity of a hydrocarbon-bearing formation comprising pumping into the formation an aqueous fluid comprising:
   (a) a carboxylated guar selected from the group consisting of carboxymethyl guar, carboxymethyl hydroxypropyl guar, and mixtures thereof, wherein the intrinsic viscosity of the carboxylated guar in 2% KCl at 27° C. is at least 750 mL/g; and
   (b) a crosslinking agent.

2. The method of claim 1, wherein the degree of substitution of the carboxylated guar is between from about 0.02 to about 0.15.

3. The method of claim 2, wherein the degree of substitution of the carboxylated guar is between from about 0.04 to about 0.12.

4. The method of claim 1, wherein the intrinsic viscosity of the carboxylated guar in 2% KCl at 27 ° C. is at least 850 mL/g.

5. The method of claim 1, wherein the molecular weight of the carboxylated guar is greater than or equal to 2,500,000.

6. The method of claim 1, wherein the aqueous fluid is a fracturing fluid.

7. The method of claim 6, wherein the fracturing fluid further comprises a proppant.

8. The method of claim 1, wherein the carboxylated guar is prepared from a reaction with a derivatizing agent of the formula $X(CH_2)_n COOH$ or alkali salts thereof, wherein X is selected from the group consisting of —OSO$_2$CH$_3$; —OSO$_2$C$_2$H$_5$; —OTs, —Br, and —I further wherein n is between from 1 to 4.

9. The method of claim 8, wherein the carboxylated guar is carboxymethyl guar.

10. The method of claim 8, wherein the carboxylated guar is carboxymethyl hydroxypropyl guar.

11. The method of claim 10, wherein the carboxylated guar, prepared by a reaction with the derivatizing agent, is further reacted with propylene oxide.

12. A method for enhancing the productivity of a hydrocarbon-bearing formation comprising pumping into the formation an aqueous fluid comprising:
(a) a carboxylated guar; and
(b) a crosslinking agent wherein the carboxylated guar is selected from the group consisting of carboxymethyl guar, carboxymethyl hydroxypropyl guar and mixtures thereof and is prepared by reacting, in a caustic medium at a temperature between from about 40° C. to about 90° C., a guar source with a derivatizing agent of the formula X(CH$_2$)$_n$COOH or alkali salts thereof, wherein X is selected from the group consisting of —OSO$_2$CH$_3$; —OSO$_2$C$_2$H$_5$; —OTs, —Br, and —I and n is between from 1 to 4, and further wherein the intrinsic viscosity of the carboxylated guar in 2% KCl at 27° C. is at least 750 mL/g.

13. The method of claim 12, wherein the carboxylated guar is carboxymethyl guar.

14. The method of claim 12, wherein the carboxylated guar is carboxymethyl hydroxypropyl guar.

15. The method of claim 14, wherein the carboxylated guar, prepared by the reaction of guar source and derivatizing agent, is further reacted with propylene oxide.

16. The method of claim 12, wherein the pH of the caustic solution is between from about 11.0 to above 14.0.

17. The method of claim 12, wherein underivatized guar and derivatizing agent are reacted in a caustic solution which further contains an aprotic solvent.

18. The method of claim 17, wherein the aprotic solvent is selected from the group consisting of tetrahydrofuran, 1,4-dioxane and oil.

19. A method of fracturing a subterranean formation comprising pumping into the formation a well fracturing fluid comprising an aqueous base fluid, a carboxylated guar and a crosslinking agent, wherein the fluid is pumped into the formation at a pressure sufficient to fracture the formation and further wherein the carboxylated guar is the reaction product of a guar source and derivatizing agent, wherein the carboxylated guar is selected from the group consisting of carboxymethyl guar, carboxymethyl hydroxypropyl guar and mixtures thereof, and further wherein the intrinsic viscosity of the carboxylated guar in 2% KCl at 27° C. is at least 750 mL/g.

20. The method of claim 19, wherein the degree of substitution of the carboxylated guar is between from about 0.02 to about 0.15.

21. The method of claim 20, wherein the degree of substitution of the carboxylated guar is about 0.04 to about 0.12.

22. The method of claim 19, wherein the intrinsic viscosity of the carboxylated guar in 2% KCl at 27° C. is higher than 850 mL/g.

23. The method of claim 19, wherein the molecular weight of the carboxylated guar is greater than or equal to 2,500,000.

24. The method of claim 19, wherein the fracturing fluid further comprises a proppant.

\* \* \* \* \*